UNITED STATES PATENT OFFICE.

ARNOLD TRALIOT, OF LEXINGTON, KENTUCKY.

SOLDERING COMPOSITION.

1,417,428. Specification of Letters Patent. Patented May 23, 1922.

No Drawing. Application filed April 2, 1921. Serial No. 458,034.

*To all whom it may concern:*

Be it known that I, ARNOLD TRALIOT, a citizen of the United States of America, residing at Lexington, in the county of Fayette and State of Kentucky, have invented certain new and useful Improvements in Soldering Composition, of which the following is a specification.

This invention relates to a composition for soldering metals.

As is well known considerable difficulty is encountered in the successful soldering of certain metals, particularly aluminum and cast iron.

An object of my invention is to provide a solder by means of which cast iron and aluminum articles may be easily and well soldered.

A further object of my invention is to provide a solder which may be easily and quickly applied and the application of which requires no special skill or apparatus.

My solder comprises the elements aluminum, tin, lead, and sulfur. These materials, preferably in a subdivided or powdered condition, are mixed together and heated and stirred until the entire mass is fluid or pasty and a homogeneous conglomerate or mixture is obtained. The proportions of the various ingredients may be varied to a considerable extent. I have found that a mixture of equal parts by weight of aluminum, tin, lead and sulfur gives a very satisfactory solder. My invention is, however, not limited to this specific composition. For producing a solder of different characteristics, for instance, having greater or less hardness or higher or lower melting point, the proportions of the metals, aluminum, tin, and lead, may be varied within a considerable range. And for the same purposes other metals may be added to the composition without departing from my invention.

One characteristic feature of my solder is its relatively high sulfur content, that is, sulfur in the proportion of about 25%. I have found that this proportion of sulfur combined with the other elements in the proportions stated gives satisfactory results. It will, however, be apparent that the proportion of sulfur may be varied somewhat without departing from my invention.

My solder is particularly well adapted to repairing and filling holes and cracks in castings, and particularly cast iron castings, such as automobile engine castings. For repairing such castings the cold solder is filled into the opening or crack and the casting is heated to a moderate temperature whereupon the solder melts and flows into the irregularities of the surfaces of the hole or crack and firmly unites with said surfaces forming a strong adherent durable filling. Or the solder may be melted and flowed into the hole or crack to be filled.

For repairing aluminum, for instance, for closing a hole in an aluminum vessel the solder is laid over the hole and gently heated.

The flame of a match held under the hole is sufficient to melt the solder.

The solder forms a firmly adherent union with aluminum, cast iron and other metals, and the cleaning of the surfaces to be united and the use of fluxes is unnecessary.

I claim:

1. A solder composition composed of aluminum, sulfur, and a plurality of metals melting at low temperatures.

2. A solder composition containing aluminum, sulfur and lead.

3. A solder composition containing aluminum, sulfur, lead and tin.

4. A solder composition composed of 25 per cent of aluminum, 25 per cent of sulfur, 25 per cent of tin and 25 per cent of lead.

5. A solder composition comprising aluminum, a metal melting at low temperature, and sulfur, said sulfur comprising about 25% of said composition.

In testimony whereof, I affix my signature.

ARNOLD TRALIOT.